United States Patent [19]

Marin et al.

[11] 4,342,087
[45] Jul. 27, 1982

[54] INDICATOR HAVING BELTS, INTENDED IN PARTICULAR FOR A RADIO ALTIMETER

[75] Inventors: Guy F. M. Marin, Boulogne; Michel M. R. Riffiod, Paris, both of France

[73] Assignee: U.S. Philips Corporation, New York, N.Y.

[21] Appl. No.: 147,886

[22] Filed: May 8, 1980

[30] Foreign Application Priority Data

May 9, 1979 [FR] France .............................. 79 11747

[51] Int. Cl.³ ........................ G01S 1/02; G06F 15/48
[52] U.S. Cl. .................................. 364/433; 364/428; 340/27 AT
[58] Field of Search ............... 364/428, 433, 562, 424, 364/426; 340/700 B, 378.5, 378.6, 809, 27 AT, 27 NA

[56] References Cited

U.S. PATENT DOCUMENTS

| 3,117,312 | 1/1964 | Watson | 340/346 |
| 3,381,656 | 5/1968 | Ohikian et al. | 340/27 AT X |
| 3,505,504 | 4/1970 | Walker | 364/427 |
| 3,634,848 | 1/1972 | Prunk et al. | 340/324 |
| 3,852,711 | 12/1974 | Greene | 340/27 R |
| 3,890,614 | 6/1975 | Argentieri et al. | 340/27 NA X |
| 3,947,809 | 3/1976 | Bateman | 340/27 AT |
| 4,016,565 | 4/1977 | Walker | 364/433 X |
| 4,114,842 | 9/1978 | Hofferber et al. | 364/433 X |
| 4,135,403 | 1/1979 | Skarvada | 364/433 X |
| 4,149,148 | 4/1979 | Miller et al. | 340/27 NA X |

Primary Examiner—Edward J. Wise
Attorney, Agent, or Firm—Robert J. Kraus

[57] ABSTRACT

This indicator preferably comprises two belts; one of the belts having graduations and the other belt a mark. This mark which has been preset to one of the graduations must be moved in the same manner as the graduated belt so that the agreement is maintained. According to the invention, two controls have been provided for driving these belts the input quantities whereof are processed by an arithmetic unit, for example a microprocessor.

20 Claims, 32 Drawing Figures

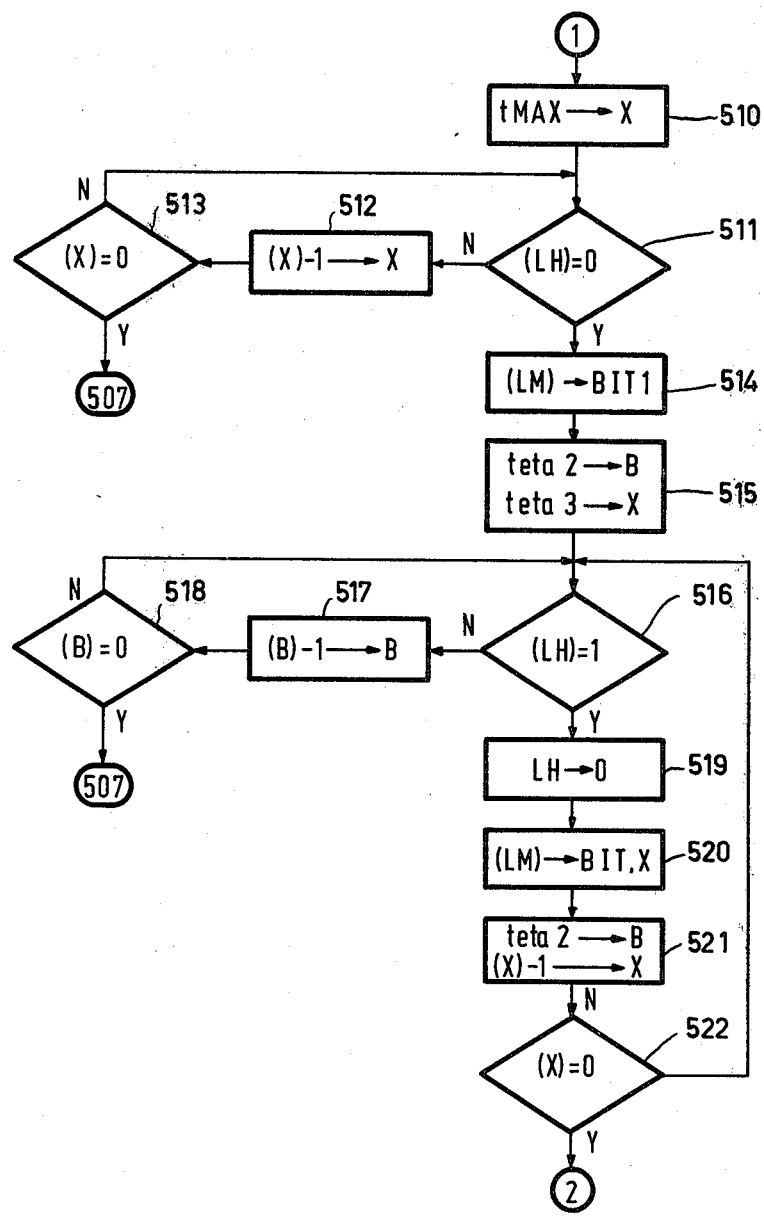
FIG.11A(II)

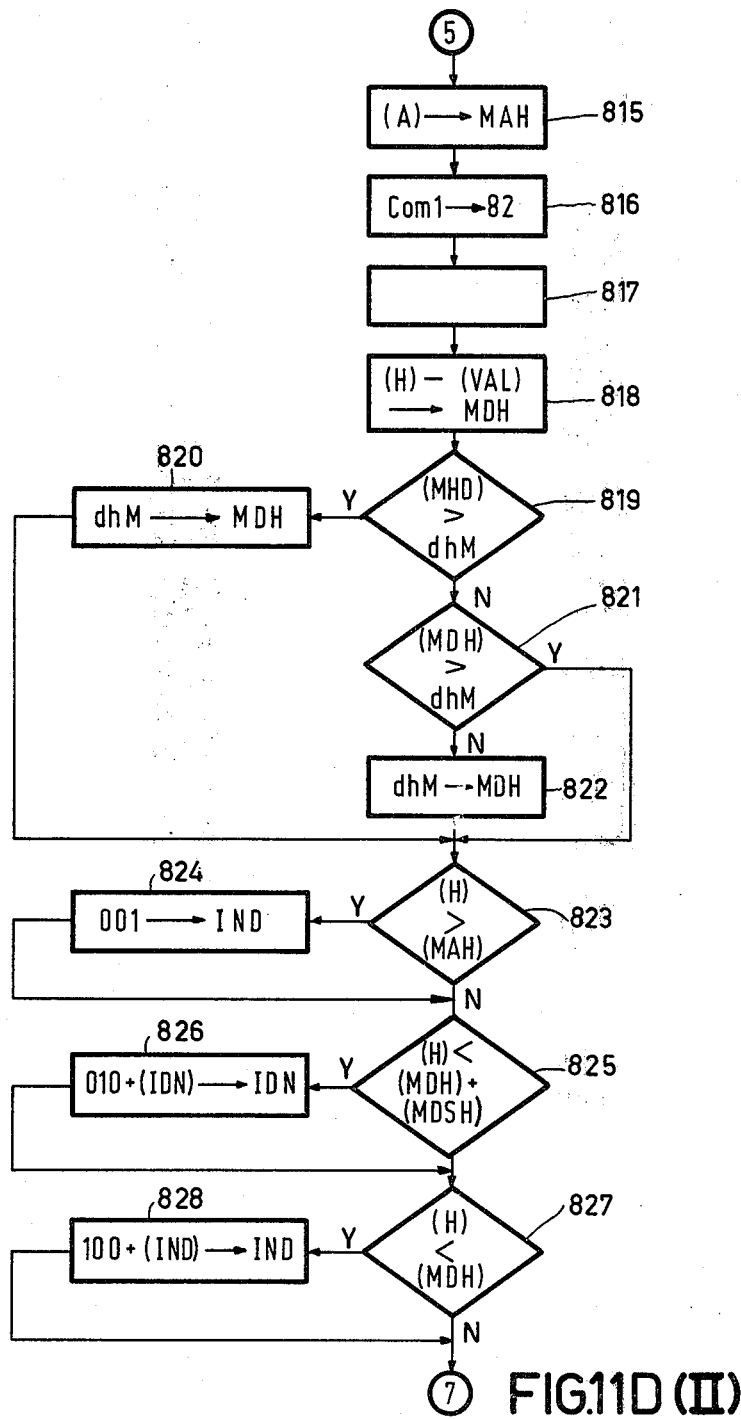
FIG.11D (II)

INDICATOR HAVING BELTS, INTENDED IN PARTICULAR FOR A RADIO ALTIMETER

BACKGROUND OF THE INVENTION

The invention relates to an indicator having a plurality of belts, intended in particular for connection to the output of a radio altimeter. The indicator has associated with each of the belts, a motor-driven drum. The indicator also has first input for receiving information which is indicated by a first belt denoted "graduated belt", which cooperates with a display window having an index and a graduation. The indicator further includes a second input for receiving reference information for presetting a reference point with respect to the graduated belt. The reference point is marked on a second band denoted the "reference belt".

When such an indicator cooperates with a radio altimeter on board an aircraft, the altitude of the aircraft is given by the first belt and is indicated by a fixed index. There is also a characteristic altitude, denoted the decision altitude, which must be clearly indicated. This altitude is important during landing. When the aircraft is below this decision attitude it must land, even if this would be dangerous in itself, because below this decision altitude it is not possible to restart the engines and to postpone the landing. Because this parameter is of the utmost importance, it is necessary that it is properly visible to the pilot. To this end the decision altitude is indicated by a mark printed on the reference belt. Once this mark has been adjusted to the desired position it must always coincide with that point on the first belt which characterizes the decision altitude, when the point is visible to the user.

In the prior art indicators this is accomplished by means of expensive mechanisms, which are difficult to produce, such as differentials, mechanical coupling and decoupling systems.

It is an object of the invention to provide an indicator which does not require the above-mentioned mechanisms.

SUMMARY OF THE INVENTION

The indicator according to the invention is characterized in that a first and second control circuit are provided for moving the graduated first belt and the reference belt, respectively. Each circuit comprises a converter for generating a signal which is indicative of the travel of the belt; a device for comparing a controlling first input quantity with the degree of belt travel and a motor controlled by the output signal of the comparison device for driving the belt. An arithmetic unit is provided to generate the first input quantity starting from the information to be indicated and for generating a second input quantity starting from the difference between the first input quantity and a quantity derived from the reference information.

A feature of the invention in accordance with which the arithmetic unit comprises a microprocessor enables a particularly advantageous construction of the indicator. This renders it possible to carry out several types of checks, before the indicated altitude is considered to be valid.

BRIEF DESCRIPTION OF THE DRAWING

The invention will now be further explained with reference to the accompanying drawing which illustrates exemplary embodiments.

DESCRIPTION OF THE PREFERRED EMBODIMENTS

Figure 1:
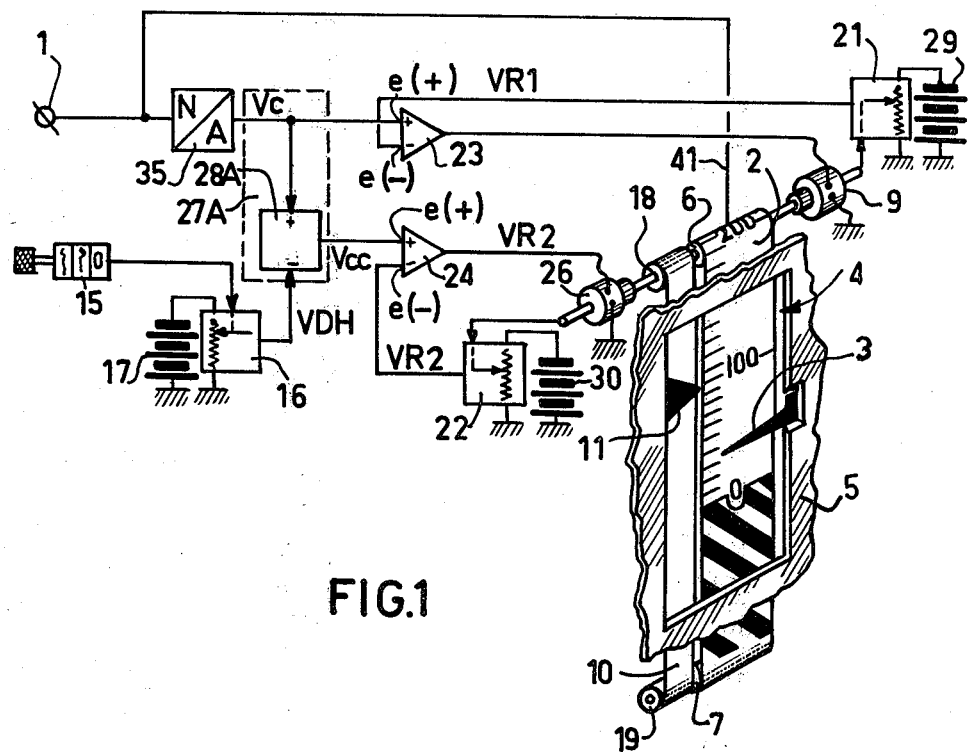
FIG. 1 shows an embodiment of the indicator according to the invention.

The indicator, which is schematically shown in FIG. 1, is intended for connection to the output of a radio altimeter which produces information in the form of code words whose bits are serially produced. The the indicator includes an input terminal 1 for receiving these words and a belt 2 which moves with respect to an indicator 3 for displaying this information. A display window 4 in a housing 5, which is partly shown, enables the user to read the value on the graduated scale which coincides with the indicator 3. The belt 2 is rolled up on two drums 6 and 7. The drum 6 is part of the drive shaft of a motor 9. The drum 7 is coupled to a spring, not shown, which keeps the belt 2 under tension, irrespective of the number of turns on the drums 6 and 7.

A second belt 10, which is positioned next to the belt 2 is provided with a mark 11, which must always coincide with the scale unit corresponding to the decision altitude. The pilot sets the decision altitude by means of a pre-setting device 15, which is subdivided into units of altitude. This pre-setting device cooperates with a variable potentiometer 16, which connected to by a battery 17, and provides a voltage which is proportional to the pre-set altitude occurring at the output. The belt 10 is also wound on two drums 18 and 19.

To displace the graduated belt 2 and the reference belt 10, there are provided in accordance with the invention a first and a second control circuit, each having respectively an angle-to-voltage converter 21, 22 for generating a voltage which is a measure of the belt travel; a comparison device 23, 24 to which a control signal and the output signal of the associated angle-to-voltage converter are applied; and a motor 9, 26 which is controlled by the output signal of the respective comparison devices 23, 24 for driving the belt 4 and 10, respectively. Additionaly, an arithmetic unit 27A is provided which, receives the aircraft altitude to be indicated from the radio altimeter and produces a control signal for the first control circuit, and determines the difference between the aircraft altitude and the decision altitude preset on the presetting device 15, and produces a control signal for the second control circuit.

The arithmetic unit 27A comprises a differential amplifier 28A having a gain factor of 1.

Each of the angle-to-voltage converters 21, 22 consists of a potentiometer, which is connected to a constant voltage source 29, 30. The output voltage is proportional to the angular shift of the drive shafts of the motors 9 and 26. The output voltage of the potentiometer 21 is applied to the input e ($-$) of the comparison device 23 and the output voltage of the potentiometer 22 is applied to the input e($-$) of the comparison device 24. Before it is applied to the input e ($+$) of the comparison 23, the digital information available at the input 1 is converted into an analog signal by means of a digital-to-analog converter 35.

Such an indicator operates as follows:

Let it first be assumed that the potentiometers 21 and 22 are identical and that the voltage sources 29 and 30 produce equal voltages. When the output voltage of the converter 21 is denoted by VR1 and the angular shift of the motor by $\theta 1$ then it holds that $$VR1 = k1.\theta 1$$

k1 being a factor which depends on the potentiometer 21 and the source 29.

When in a similar manner the output voltage of the potentiometer 22 is denoted by VR2 and the angular shift of the motor 26 by $\theta 2$, then it holds that:

$$VR2 = k2.\theta 2$$

k2 being a factor which depends on the potentiometer 22 and the source 30. As these elements are identical to the elements 21 and 29 it may be assumed that:

$$k = k1 = d2.$$

When the first control circuit is in operation the voltage VC, produced by the digital-to-analog converter 35 and applied to the input e($+$) of the comparison device 23 is substantially equal to the voltage at the input e($-$) so that:

$$VC = VR1.$$

When the second control circuit is in operation, the voltage VCC which is produced by the elements 27 and applied to the input e($+$) of the comparison device 24 is equal to the voltage VR2. If now the potentiometer 16 produces an output voltage VDH, it then holds that:

$$VR2 = VCC = VC\text{-}VDH = VR1\text{-}VDH. \tag{R1}$$

When the decision altitude has been adjusted on the pre-setting device 15, the voltage VDH remains fixed. When now the altitude changes, $\theta 1$ increases by an amount $\Delta\theta 1$ and $\theta 2$ increases by an amount $\Delta\theta 2$. As will be shown hereinafter it will holds that:

$$\Delta\theta 2 = \Delta\theta 1.$$

In response to the increase $\Delta\theta 1$ of the angular shift, the potentiometer 21 produces a voltage VR1':

$$VR1' = VR1 + k.\Delta\theta 1. \tag{R2}$$

and in response to the increase $\Delta\theta 2$, the potentiometer 22 produces a voltage VR2':

$$VR2' = VR' - VDH = VR2 + k\Delta\theta 2$$

which may be written as:

$$VR1' = VR2 + VDH + k\Delta\theta 2. \tag{R3}$$

When the relations (R1) and (R2) are taken into consideration, the relation (R3) is written:

$$VR1 + k.\Delta\theta 1 = VR1 + k.\Delta\theta 2$$

so that $\Delta\theta 2 = \Delta\theta 1$.

Figure 2:
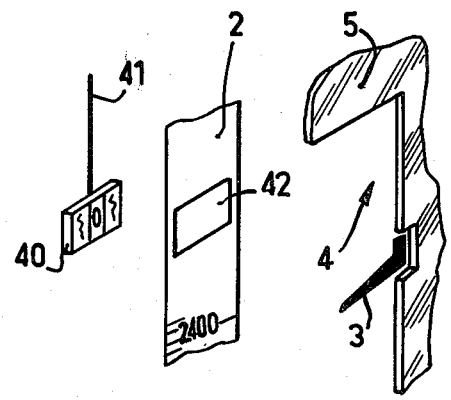
FIG. 2 is an exploded perspective view of a detail of the indicator of FIG. 1.

The belt 2, which does not have an infinite length can only indicate a limited altitude range. In order to render it possible to indicate the altitude outside the graduation of the belt, a digital display device 40 has been provided (see FIG. 2), which is connected to the input terminal 1 via a connection 41. This display device is positioned behind the belt 2 and is only visible when an altitude of, for example, 2500 (feet) has been exceeded. At this altitude unrolling of the belt is blocked and a peephole 42 provided in the belt appears, so that the pilot sees the numeral indication of the altitude through the display window 4 and the peephole 42 on the digital display device.

Figure 3:
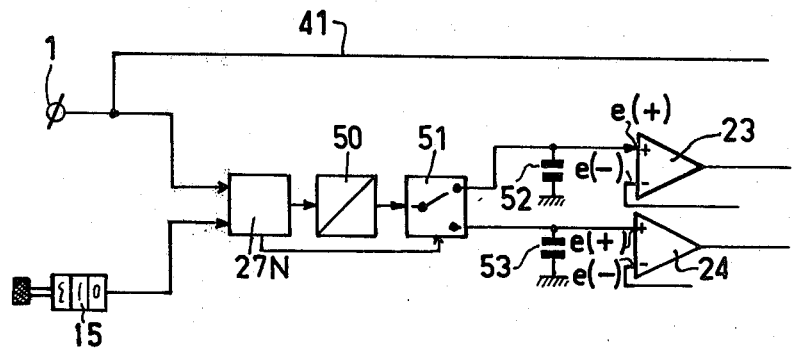
FIG. 3 shows a variation of an embodiment of an indicator according to the invention.

FIG. 3 shows a variation of the indicator according to the invention. In this Figure the components which are the same as those of FIG. 1 have been give the same reference numerals. In FIG. 1, the analog signals are applied to the arithmetic unit 27A, while digital signals are applied to the arithmetic unit of the arrangement shown in FIG. 3. The arithmetic unit is denoted by 27N in FIG. 3. The digital altitude word present at input 1 and a digital decision altitude word produced by the presetting device 15 are applied to this arithmetic unit. The arithmetic unit 27N alternately produces code words which are alternately applied as analog input signals to the first and the second control circuits. The digital output signals of the unit 27N are converted into analog signals by a digital-to-analog converter 50. The output voltage of this converter is alternately applied to two capacitors 52 and 53 by means of a switch 51, at the same speed as the speed with which the unit 27N calculates the code words. These capacitors retain their voltage between two switching actions of switch 51.

Figure 4:
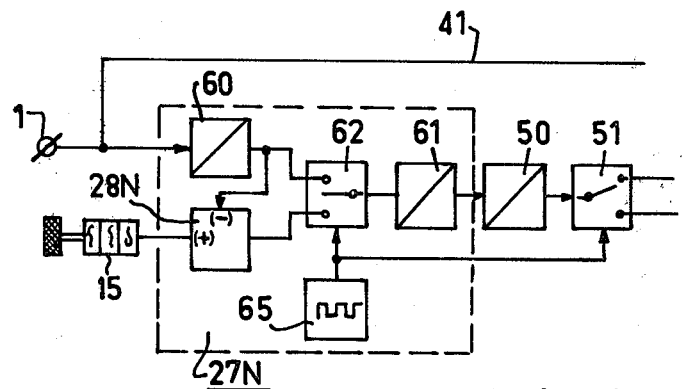
FIG. 4 shows another variation of an embodiment of an indicator according to the invention.

As the arithmetic unit is of the digital type, the control of the motor 9 can be realized in a simple manner such that an angular shift of the shaft 6 is no longer a linear function of the flying altitude but, for example, a logarithmic function, so that the thickness of the belt can be taken into consideration. To this end the arithmetic unit 27N can be implemented in the manner shown in FIG. 4. The arithmetic unit 27N shown there comprises two code converters 60 and 61. Code converter 60 converts each linear code words which is applied to the input 1 into a number which represents the logarithm of this code word. The second code converter 61 introduces a correction having an amount which depends on the belt thickness. The input of the code converter 60 is connected to the input 1 and its output is connected to the input of a commutator 62 and also to the input (−) of a digital subtracting unit 28N. The (+) input (+) of this unit 28N is connected to the pre-setting device 15. The output of unit 28N is connected to another input of the commutator 62. The output of this commutator is connected to the second code converter 61, whose output is connected to the input of the digital-to-analog converter 50. A signal generator 65 sends periodically-occurring control pulses synchronously to the switches 62 and 51.

Such an arithmetic unit operates as follows:

During a first time interval the altitude information present at the input 1 is examined and from this information the voltage is determined which must be applied to the input e (+) of the amplifier 23 of the first control circuit, without taking the belt thickness into consideration. As the arithmetic unit 27N is of the digital type, it is easy to ensure that this converter 60 produces a code word such that for low altitudes the displacement I1 of the belt is a linear function of the altitude H and for higher altitudes the displacement (which will be denoted I2) is a logarithmic function of the altitude h. For example, belt displacement can be expressed in the following manner, the altitude h being measured in feet:

$$(R4) \begin{cases} \text{for } 0 \leq h \leq 480: I1 = c1 \cdot h \\ \text{for } 480 \leq h \leq 2500: I2 = C1 \cdot 480 + \left[ 10 \log_e \left( \frac{h + 20}{500} \right) \right] \cdot c2 \end{cases}$$

where $c1 = 0.30$ mm/ft $c2 = 15.2$ mm/ft

The code converter 60 may be implemented as a ROM. The address code of this memory is then formed by the code word at the input 1.

During a second time interval the code word is determined which corresponds with the voltage applied to the input e (+) of the amplifier 24 of the second control circuit. This code word is obtained by subtracting the code word produced by the code converter 60 from the code word produced by the pre-setting device 15.

The converter 61 has been provided to introduce a correction in view of the thickness of the belts. The code conversion carried out by this converter is based on the following considerations.

The belts are wound on or unwound from a drum whose radius is $R_o$. If the angular shift of this drum with respect to a given output position is equal to $\theta$ and if the length of the belt unwound (or wound) by this angular shift is equal to "I", the thickness "e" having been taken into consideration, then it holds that:

$$I = R_o \left( 1 + e \cdot \frac{\theta}{2 \pi} \right) \cdot \theta \quad (R5)$$

The angle $\theta$ is proportional to the voltage at input e (+) of the amplifier 23. If now $C\theta$ is assumed to be the code applied to the input of the code converter 60 it can be symbolically written that:

$$C\theta = K \cdot \theta \quad (R6)$$

It is now desired that the code $(C\theta)'$, which is produced by the code converter 61, is related to the length of the wound-up belt in accordance with the expression:

$$(C\theta)' = k \cdot \frac{I}{R_o} \quad (R7)$$

In that case the thickness of the paper of which the belt is made need not be taken into consideration for the graduation of the belt. In order to realize expression (R7), the converter 61 must have a transfer function which is the reverse of that of the rule governing unwinding of the belt defined by the relation (R5). The arithmetic unit will then convert the code $C\theta$ to code $(C\theta)'$ in the following manner:

$$C\theta = \frac{-1 + \sqrt{1 + 4 \delta (C\theta)'}}{2 \delta} \quad (R8)$$

where $$\delta = K \cdot \frac{e}{2 \pi}$$

The converter 61 may be implemented with, for example, a ROM, to which the code words $C\theta$ are applied as the address code and whose content is defined by expression (R8).

Figure 5:
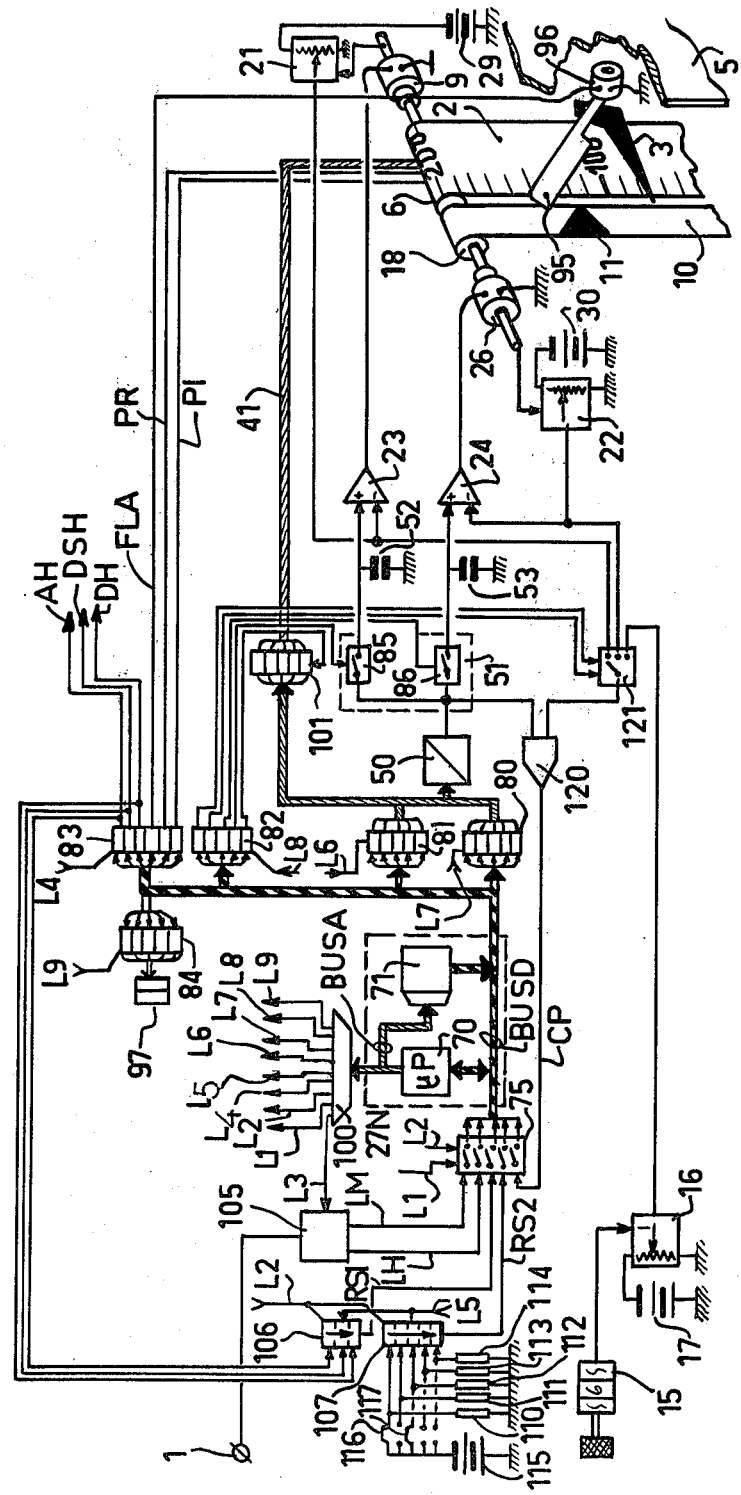
FIG. 5 shows another embodiment of an indicator according to the invention.

FIG. 5 shows a preferred embodiment of the device according to the invention. The elements which are the same as those of the other Figures have been given the same reference numerals. The arithmetic unit 27N comprises a microprocessor 70 to which a store 71 is connected, which contains the information of the work program. The microprocessor used is the MOTOROLA MC 6802 which has two common BUS lines BUSD and BUSA. The line BUSD transmits data in two directions, that is to say both data applied to the microprocessor and data generated by the microprocessor. The address codes which are generated by the microprocessor 70 are transferred over the line BUSa. The BUS line BUSd is connected, for the transmission of external data, to the microprocessor, to an input circuit, which is shown symbolically in FIG. 5 by a switching device 75. This switching device 75 is controlled by two control signals, which are designated L1 and L2, respectively. The data produced by the microprocessor are temporarily stored in registers 80, 81, 82, 83, 84 to which control signals are applied which are designated L7, L6, L8, L4, L9, respectively. The inputs of the digital-to-analog converter 50 are connected to the outputs of the registers 80 and 81. The register 82 comprises inter alia switching information for the commutator 51. The embodiment shown in FIG. 5 of this commutator is formed by two voltage-controlled interruptors 85, 86.

The register 83 contains several different signal states, which are available on the wires AH, DSH, DH, FLA, PR, PI. The information available on the wires AH, DSH and DH can be applied to further apparatus of the aircraft and are not necessarily visible to the user. This information relates to different parameters, such as for example, the alarm altitude, the change in altitude with respect to the decision altitude, and the decision altitude. This information may, for example, be useful for an automatic pilot. The information on the wire FLA ensures, for example, that an indication flag appears across the display window of the indicator, indicating that the displayed flying altitude is not to be trusted. The appearance of this indicating flag is caused by a motor 96 which is controlled by the signal on the wire FLA.

Figure 7:
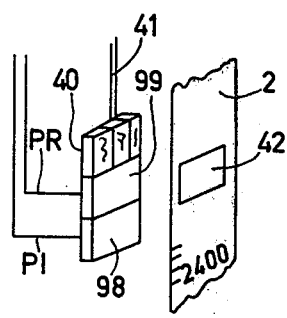
FIG. 7 is an exploded view showing the position of some components of the indicator shown in FIG. 5.

The register 84, which cooperates with the digital element 97 ensures that a number is displayed on the element 97 in the case of a defect. As shown in FIG. 7, two pilot lamps 98 and 99 have been provided, which are switched on by the signals present on the wires PI, PR. When one of these lamps is lit, this is visible through the peephole 42. If now a signal occurs on the wire PR, this is an indication that the radio altimeter is defective. If, however, a signal appears on the wire PI, then elements of the indicator are defective.

A transcoding device 100, whose inputs are connected to wires of the BUS line BUSa produces signals on different wires L1, L2, L3, L4, L5, L6, L7, L8 and L9. A certain address code, produced by the microprocessor 70, causes a signal to be produced on one or more of the wires L1 ... L9. A register 101 whose inputs are connected to inputs of the converter 50 and whose outputs are connected to a BUS wire 41 and which is controlled by the signal occurring at one of the outputs of the register 82, puts the digital display device 40 (see FIG. 7) into operation, when the belt has been fully unwound and this display device 40 becomes visible through the peephole 42.

Switching device 75 has five inputs. The first two inputs are connected to the outputs of a converter 105 (which is shown in detail in FIG. 6), which in response to the logic signals supplied by the radio altimeter produces at one of its outputs a two-level logic signal and at its other output a signal which indicates that data are indeed applied to this converter. This converter is controlled by the signal which is present on the wire L3 of the transcoder device 100.

Via a wire RS1, the third input of the switching device 75 is connected to the output of a shift register 106 whose input for shift signals is connected to the wire L5 and whose write-shift command circuit is connected to the wire L2. This register 106 further comprises parallel inputs which are connected to the wires AH, DSH and DH.

Via a wire RS2, the fourth input of the switching device 75 is connected to the output of a second shift register 107, whose input for shift signals is connected to the wire L5 and whose write-shift command input is connected to the wire L2. This register 107 further comprises parallel inputs, which are connected on the one hand to ground via resistors 110, 111, 112, 113 and 114 and, on the other hand, to the terminal of a voltage source 115 via disconnectable connections 116, 117.

These connections cause voltages representative of the logical states of parallel bits of a code word to be applied to the register 107. In the case described here, two parameters are encoded, namely the alarm altitude and the change in altitude with respect to the decision altitude. The alarm altitude is signalled on the wire AH. When the altitude of the aircraft becomes lower than the decision altitude, a signal becomes available on the wire DSH. The code word applied to the register 107 is fixed during installation of the indicator. Although in FIG. 5 the register 107 can only contain five bits, it will be clear that this number may, alternatively, be greater so that the alarm altitude and the changes in altitude can be coded with a higher degree of accuracy.

The fifth input of the switching device 75 is connected to the output of a comparison device 120, which produces logic signals "1" and "0" as a function of the relative magnitude of the analog signals which are applied to its two inputs. One of these inputs is connected to the output of the analog-to-digital converter 50 and the other one to the output of a change-over switch 121 for analog signals, which is controlled by information present in the register 82. A first input of the change-over switch 121 is connected to the output of potentiometer 16, a second input to the output of potentiometer 21 and a third input to the output of potentiometer 22.

Figure 6:
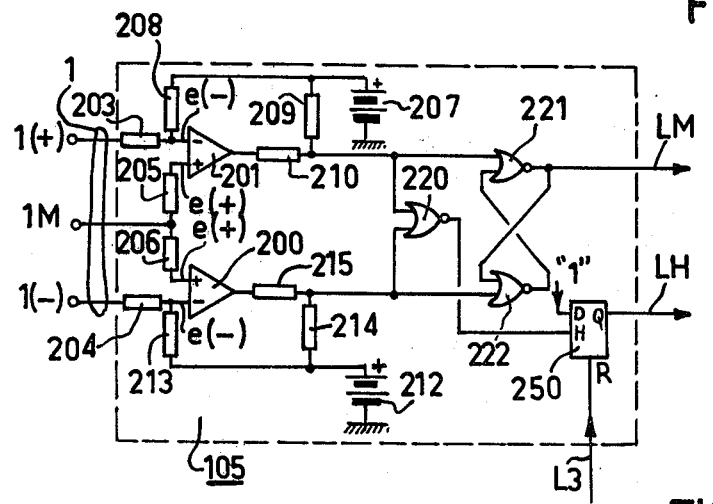
FIG. 6 shows in detail a converter which forms part of the indicator shown in FIG. 5.
Figure 8:
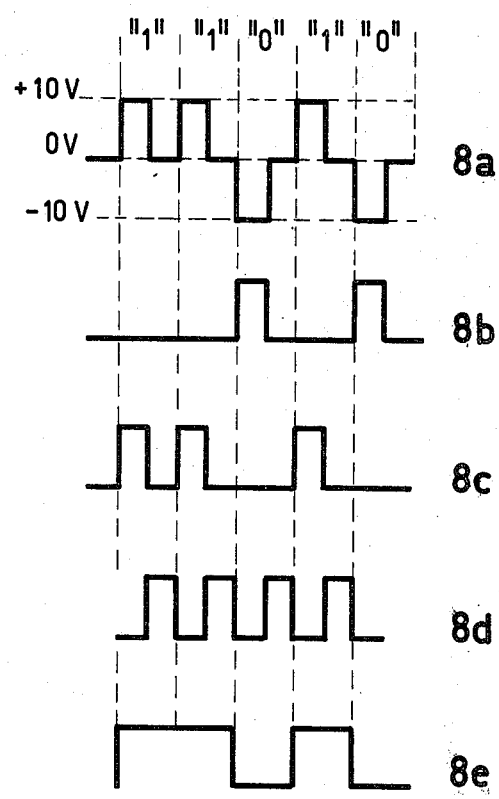
FIG. 8 shows the organisation of signals occurring in the converter shown in FIG. 6.

The converter 105 which is shown in detail in FIG. 6, is intended to convert the signals received in the form of RZ (return to zero) signals into logic "NRZ (non return to zero) signals. In FIG. 8, the variation of the RZ signals which are supplied to the input 1 (+) and 1(M) are shown at "a". These signals contain a sequence of binary elements, for example: "1", "1", "0""1""0". The voltage of these signals varies betwen +10 V and −10 V and between the two transitions the signal has the value zero volt for a predetermined period of time. The same signals are present between the inputs 1(−) and 1(M); however, with the opposite polarity.

This converter 105 comprises two amplifiers 200 and 201, which are connected as a comparison device. The input e(−) of the amplifier 201 is connected to the input 1(+) via a resistor 203 and the input e(−) of the amplifier 200 is connected to the input 1(−) via a resistor 204. The inputs e(+) of the amplifiers 201 and 200 are connected to the input 1(M) via resistors 205, 206, respectively. The (+) pole of a voltage source 207 is connected to the input e(−) of the amplifier 201 via a resistor 208, and also to the output of this amplifier 201 via the series arrangement of two resistors 209 and 210. The (+) pole of a voltage source 212, which in practice may coincide with the voltage source 201 is connected to the input e(−) of the amplifier 200, via a resistor 213, and also the output of the amplifier 200 via the series arrangement of two resistors 214 and 215. A first input of two NOR-gates having two inputs 220 and 221, is connected to the junction of the resistors 209 and 210. Connected to the junctin of the resistors 214 and 215 there are, on the one hand, the other input of the gate 220 and, on the other hand, a first input of a NOR-gate 222, which has two inputs; the gates 221 and 222 are connected as a flip-flop, that is to say the output of the gate 221 is connected to the second input of the gate 222 and the output of the gate 222 is connected to the second input of the gate 221. A wire LM is connected to the output of the gate 221. The input for clock signals received from a D-flip-flop 250 is connected to the output of the gate 220. The input D of this flip-flop permanently receives a logic signal having the value "1". The wire LH is connected to the output Q and the reset input is connected to the wire L3.

The operation of this arrangement will be further explained with reference to FIG. 8.

As the amplifier 201 is connected as a comparison device, it produces a positive signal having the logic value "1" when the signal at the input 1(M) is smaller than the signal at the input 1(+). This is shown at "b" in FIG. 8. The amplifier 200 produces a positive signal when the signal at the output 1(M) is greater than the signal at the input 1 (−1) (see FIG. 8, line "c"). The gate 220 produces signals, whose variation is shown at "d" in FIG. 8. The flip-flop formed by the gates 221 and 222 produces at its output LM the signal shown at "e" in FIG. 8.

It should be noted that the flip-flop 250 detects the presence of data at terminal 1, as all transitions appearing at the input of the gate 220 set this flip-flop to the position "1". This flip-flop can be reset to zero by a signal on L3.

For a proper understanding of the operation of such an indicator, let it now be assumed that, in accordance with the standard ARINC 707 of the aviation of the United States of North America, 32-bit words with serial bits are applied to the input 1, the data thus formed being in the form known as RZ-data (return to zero).

Figure 9:
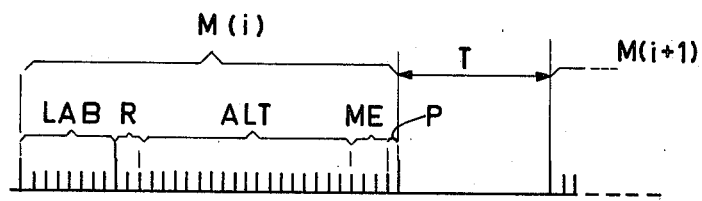
FIG. 9 shows the organisation of information to be supplied by a radio altimeter.

The structure of such a word is shown in FIG. 9. This word, denoted by M(i), comprises in a first portion an eight-bit word LAB, which indicates the code form of the code word which is determined by the subsequent bits (for example this word LAB indicates whether the next code word is a purely binary code, or a BCD code). In this example only the purely binary code is processed by the indicator. In a second portion M(i) comprises a two-bit word R, which will not be used in this embodiment. M(i) further comprises an 18-bit word ALT, which is the actual altitude code word, and, in addition, a twenty-ninth bit, which indicates the polarity of the altitude word. The word M(i) further comprises a two-bit word ME which is indicative of whether the radio altimeter is functioning properly or not, whether the altitude is too high or whether the altimeter is being tested. Finally, M(i) also comprises a parity bit P, which has such a value that the number of "1"-bits of which M(i) consists, is even.

The duration of each bit may vary between 70 and 84 μs. The time interval T, which separates two consecutive words M(i) and M(i+1) has a minimum value "t min" of 210 μs and a maximum value "t max" of 50 mS.

Figure 10:
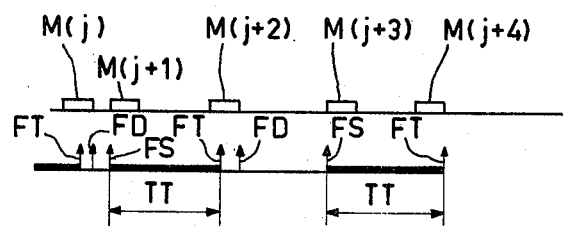
FIG. 10 shows the duration of the signal processing by the indicator of FIG. 5 of the signals produced by the radio altimeter.

The operation of the indicator is shown schematically in FIG. 10. The rectangles on the upper line of FIG. 10 represent the different words M(j), . . . , M(j+4) which are consecutively released by the radio altimeter. On the bottom line a thick black line having a length TT represents the period of time during which a code word M(j) is processed in the arithmetic unit 27N. At the end of this time interval TT, the presence of a word M(i) is checked. This is schematically shown by the arrow FT. If there is a word M(i), it is thereafter determined whether this word has disappeared again at an instant denoted by the arrow FD. At the beginning of the next word (schematically shown by the arrow FS) processing of the preceding word is started.

The processing period is subdivided into different operating phases which are cycled through under the control of the program stored in the store 71. These phases are:

phase 1. During this phase the altitude word received from the radio altimeter is written in.
phase 2. The parity of this word is checked.
phase 3. The written-in word is converted into a number which represents the logarithm of this altitude word, the thickness of the belt being taken into consideration.
phase 4. The content of the register 107 is read. The voltage which represents the decision altitude is coded into digital form and written into the register 107. The calculation which determines unwinding of the belt 10 is carried out.
phase 5. The input quantities at the first and the second control circuits are produced.
phase 6. The result of the drive of the motors 9 and/or 26 is checked.
phase 7. The various signals are applied to the wires AH, DSH, DH and it is checked whether these signals are correct.

When irregularities occur during one of these phases, a switch to an error sub-program, which will be further explained hereinafter, is made.

The different phases will now be further described by the use of flow charts.

Figure 11A:
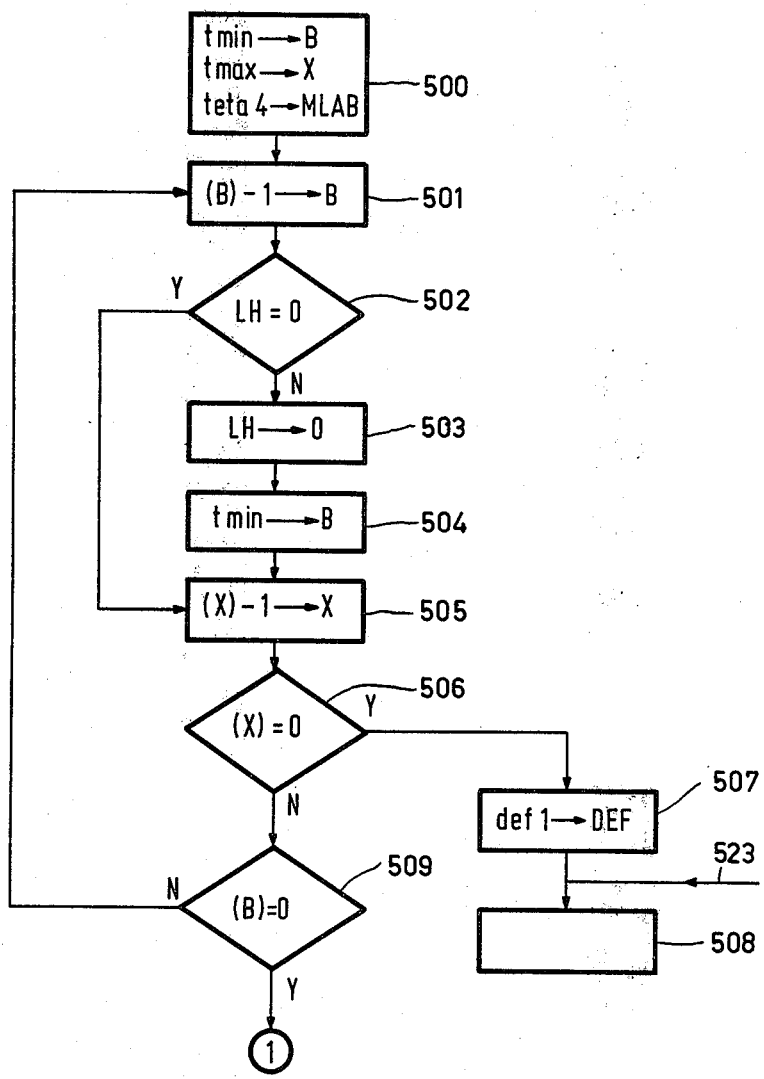
FIG. 11 shows how the belt thickness correction and the logarithmic law are processed by the indicator shown in FIG. 5.

FIG. 11A shows the flow chart of phase 1. This phase contains a step 500 in which the words for "t min" are written into the store B and the value of "t max" is written into the store X. In addition, there is written into a store MLAB the value "teta 4", which indicates the maximum number of non-processed codes that can be accepted before it is stated that irregularities occur during operation. In step 501 the content of the store B is reduced by one. Thereafter, in step 502 it is checked whether data are present at input 1. To that end it is checked whether a signal is present on the wire LH, for which purpose, by means of a signal on wire L1, that switch of switching device 75 closes which causes LH to be connected to BUS-line D. For each decision step in this chart, Y represents yes and N represents no. If now (LH)=1, the flip-flop 250 (see FIG. 6) is reset to its zero position, as a result of which LH→0 (step 503). To this end, a reset pulse is applied to this flip-flop 250 via wire L3 of the transcoding device 100. Thereafter, the store B is reset to its initial position in step 504. Thereafter, in step 505, the content of the store X is reduced by one and in step 506 it is checked whether the maximum permissible period of time (t max) has elapsed. If so, there is an indication that an irregularity has occurred and a code "def 1" is generated which, in accordance with step 507, is applied to a store DEF, which comprises an error sub-program corresponding with this code "def 1" and which is activated by this code "def 1" in accordance with step 508. When in step 506 no answer is received any longer to the test when it was carried out, it is checked in step 509 whether the minimum period of time t min has elapsed; if not the procedure is restarted from step 501; when the minimum period of time t min has indeed elapsed, then the store X is reset to its initial state in step 510. Thereafter, in step 511, it is again checked whether a signal is present on line H, if so then LH=1 and the store X is again reduced by one in step 512, and it is checked in step 513 whether (X) already has the value zero; as long as this is not the case the procedure is restarted from step 511. If, however, (X)=0 at a certain instant, then the procedure is continued from step 507 because the error code "def 1" is generated. If, however, at a certain instant it is ascertained that LH=0, then the data available on line LM are entered into a store BIT1 (step 514) by means of a switching device 75. Thereafter, in step 515, the value teta 2 is written into the store B and the value teta 3 into the store X, teta 2 representing the bit length of the bit on LM and teta 3 representing the number of bits of the code word on LM. Thereafter, in step 516, it is checked whether LH=1. If not, the store B is reduced by one in step 517 and in step 518 it is checked whether (B) already has the value zero; as long as this is not the case, the procedure is restarted from step 516; if, however, at a certain instant (B)=0, then the procedure is continued from step 507 because the error code "def 1" is generated. If, however, at a certain instant it is ascertained that LH=1, this means that data are present on line LM. In step 519 LH is first adjusted to the zero state again because flip-flop 250 is reset, and in step 520 the data on LM is written into the store BIT X, X indicating the storage location. Thereafter, in step 521, the store X is reduced by one. In step 522 it is now ascertained whether X=0; if not, the procedure is restarted from step 516; if, however, X=0, then this means that the altitude code word has been written into the microprocessor store and step 601 of phase 2 is carried out.

Figure 11B:
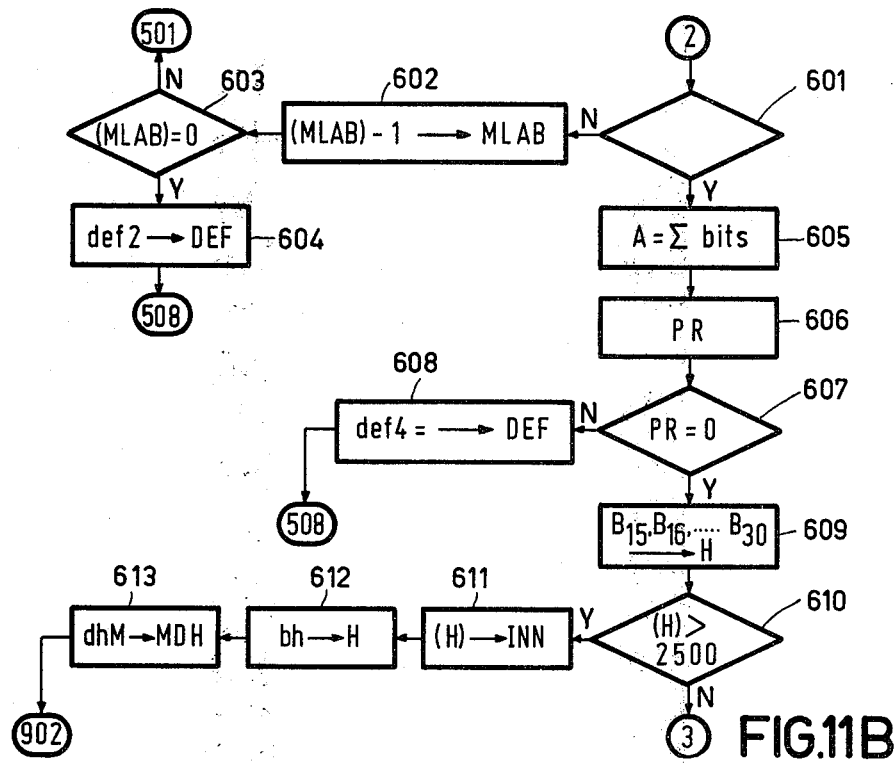

FIG. 11B shows the flow chart of phase 2. In this phase the altitude code word is checked. This phase starts with the step 601 in which it is checked whether the code word which is formed by bits 25 to 32, inclusive, of the altitude code word has a predetermined size; if so, a parity check is carried out, if not, the content of the store MLAB is reduced by one in step 602 and in step 603 it is checked whether MLAB=0; if not, the procedure is restarted from step 501 of phase 1, if, however, MLAB=0, then in accordance with step 604, the code word "def 2" is generated, which activates the error sub-program step 508 of phase 1. The parity check is carried out as follows: in step 605 the sum is formed of all bits of which the altitude code word consists. The polarity of this sum is multiplied in step 606 by the parity bit (a positive polarity is presented by, for example, a "0"-bit, a negative polarity by, for example, a "1"-bit) causing a product bit PR to be produced. This product PR is checked in step 607. If PR is unequal to zero, that is to say when the build-up of the altitude code word is not correct, then an error code "def 4" is generated and applied, in accordance with step 608, to the store DEF, which comprises an error sub-program corresponding with this code and which is activated by this code. If PR=0, the sixteen most significant bits $B_{15}$ to $B_{30}$, inclusive, of the altitude code word are transferred in step 609 to a store H. In step 610 it is checked whether the number formed by the sixteen bits exceeds a predetermined value corresponding to a certain flying height, in this example 2500 feet. If this is indeed the case, the content of the store H is transferred to a store INN in accordance with step 611, thereafter a code "bh" is written into the store H in accordance with step 612. This code "bh" is converted by the digital-to-analog converter 50 into an analog signal value, causing the belt 2 to be displaced such that the peephole 42 is moved in front of the digital indicator 41 (see also FIG. 7). In addition, in a step 613, a code dhM is wirtten into a store MDH, causing the belt 10 to be moved to its highest position and thereafter phase 5 is entered. If (H) is less than 2500 feet then step 701 of phase 3 is carried out.

Figure 11C:
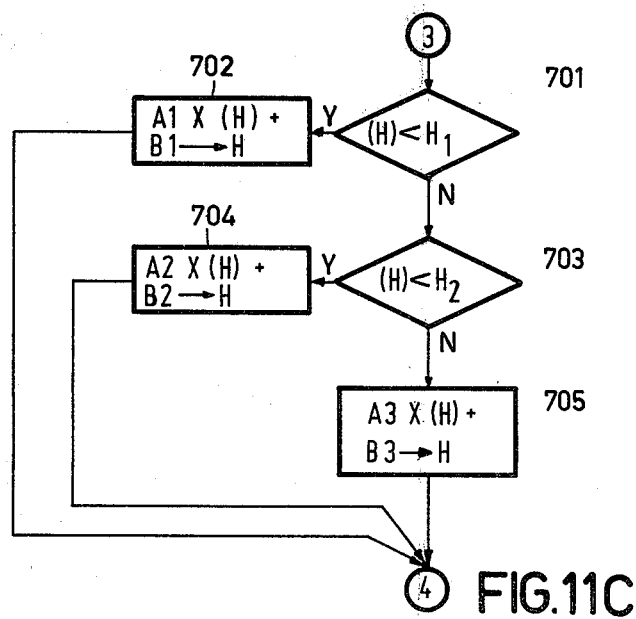
Figure 12:
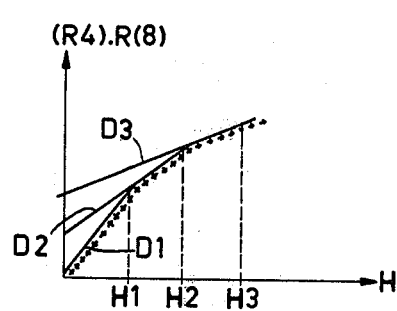
FIG. 12 is a graph of height versus the product of two expressions R4, R8.

The flow chart of phase 3 is shown in FIG. 11C. In this phase the altitude code word entered into the store is converted into its logarithmic equivalent, in accordance with expression (R4), the thickness of the belt being taken into consideration, in accordance with expression (R8). The product of R8 and R4 as a function of the height H is shown graphically in FIG. 12. The relationship shown there can be approximated by a number of consecutive straight lines, which form the segments of the characteristic curve. For simplicity, FIG. 12 shows only the three segments D1, D2, D3. Depending on the value written into the store H further use is now made of the comparison of the line $D_1$ or that of $D_2$, or that of $D_3$. As shown in FIG. 12, segment $D_1$ changes to $D_2$ at an altitude H, $D_2$ to $D_3$ at an altitude $H_2$, $D_3$ changes to $D_4$ at an altitude $H_3$ etc. In step 701 of phase 3 it is checked whether (H) is greater or smaller than $H_1$. If $(H)<H_1$, the comparison of line $D_1$ is used in step 702 to determine the product R4. R8, and phase 4 is started. If $(H)>H_1$, then in step 702 it is checked whether $(H)<H_2$; if so the comparison of line $D_2$ is used in step 704 to determine the product R4. R8 and thereafter phase 4 is started. If $(H)>H_2$, the comparison of line $D_3$ is used in step 705 to determine the product of R4. R8 and thereafter phase 4 is started. The result of a computation carried out in this phase can be found in the store H and is suitable for application to the digital-to-analog converter 50.

Figure 11D:
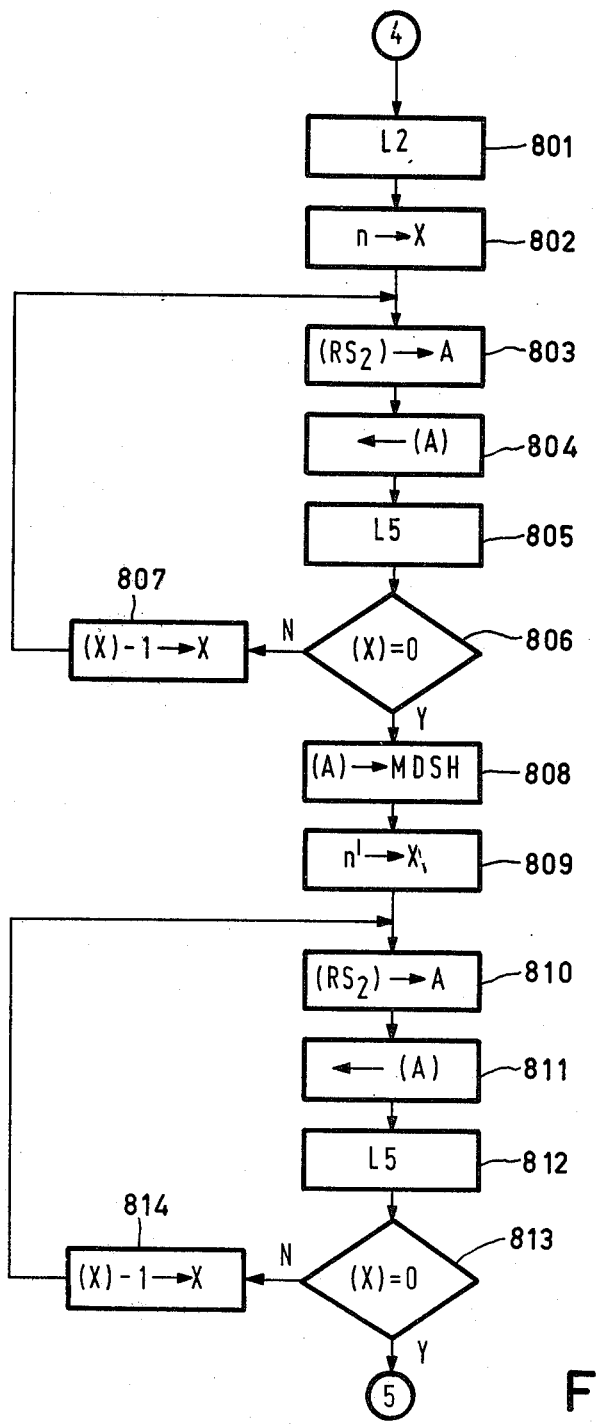

The flow chart of phase 4 is shown in FIG. 11D. In this phase, line L2 is first activated by step 801, causing the data applied to the registers 106 and 107 to be stored in this register. Thereafter, in step 802 the number of bits n with which the change-over in the altitude stored in the register 107 is described, is transferred to the register X. In step 803 the signal present on line RS2 is stored in a storage location of the store A. In step 804 this number is shifted in its totality over a number of bit positions to the left. In step 805, line L5 is addressed, causing a shift of the content of the register 107. In step 806 the number of shift steps is counted. When the proper number of shift steps has not yet been attained, the desired number is reduced in step 807 by one and the procedure is restarted from step 803. When the proper number of shift steps has been applied to the register 107, (X)=0, then the content of the store A is transferred to a store MDSH in step 808. The content of this store now represents the change in altitude. The same procedure is now adapted for the n' bits of the alarm altitude. To this end the steps 809 to 814 inclusive, shown in FIG. 11D are carried out and the ultimate result is entered into a store MAH in accordance with step 815.

Therafter, the decision altitude set by the potentiometer 16 is read. To this end, in accordance with step 816, a certain number COM1 is written into the register 82. To this end a signal is applied to the line L8, causing the code word present on BUS-line D to be written into a register. As outputs of this register 82 are connected to control switches, to the switch 121 in particular, the two input signals of the differential amplifier 120 are brought into agreement. To this end, starting from the difference signal produced by the differential amplifier 120, a sub-program (step 817) is carried out, which converts this difference signal into a digital code word. This code word is stored in a store VAL.

Now the code which determines unwinding of the belt will be determined. To this end, in step 818, the difference is determined between the altitude in the store H and the digital difference code word in VAL. This difference is stored in a store MDH. This difference code word in MDH is now checked in step 819. In this step it is checked whether the code word in MDH is greater than a word dhM, which has been chosen such that an unwinding of the belt 10 corresponds therewith when the mark 11 is no longer displayed in the window 4. If (MDH) is greater than dhM, then dhM is written into the store MDH in step 820 and step 823 is started. If (MDH) is smaller than dhM it is checked in step 821 whether it is not too small. More particularly, it is checked whether it exceeds a number dhm. If so, (MDH)>dhm and step 823 is also started. If, however, (MDH)<dhm the number dkm is written into the store MDH in step 822.

In step 823 the content of the store H is compared with the alarm code word (MAH). When this code word in store H is greater than this alarm code word then a logic "1" is entered into a storage location of store IVD in accordance with step 824, and thereafter step 825 is started. If the alarm code word is greater than (H) then step 825 is also started.

In step 825 the altitude code word in store H is compared with the decision altitude stored in store MDH. A certain margin is observed. This margin is given by a code word in a store MDSH. If the altitude code word (H) is smaller than (MDH)+(MDSH), a logic "1" is written in step 826 in a second storage location of store IND and thereafter, and also when (H)>(MDH)+(MDSH), step 827 is started.

In step 827 the altitude code word (H) is compared in store H with the real decision altitude (MDH). If (H) is smaller than (MDH), a logic "1" is written into a third storage location of store IND in step 828 and thereafter, and also when (H)>(MDH), step 901 of phase 5 is carried out.

Figure 11E:
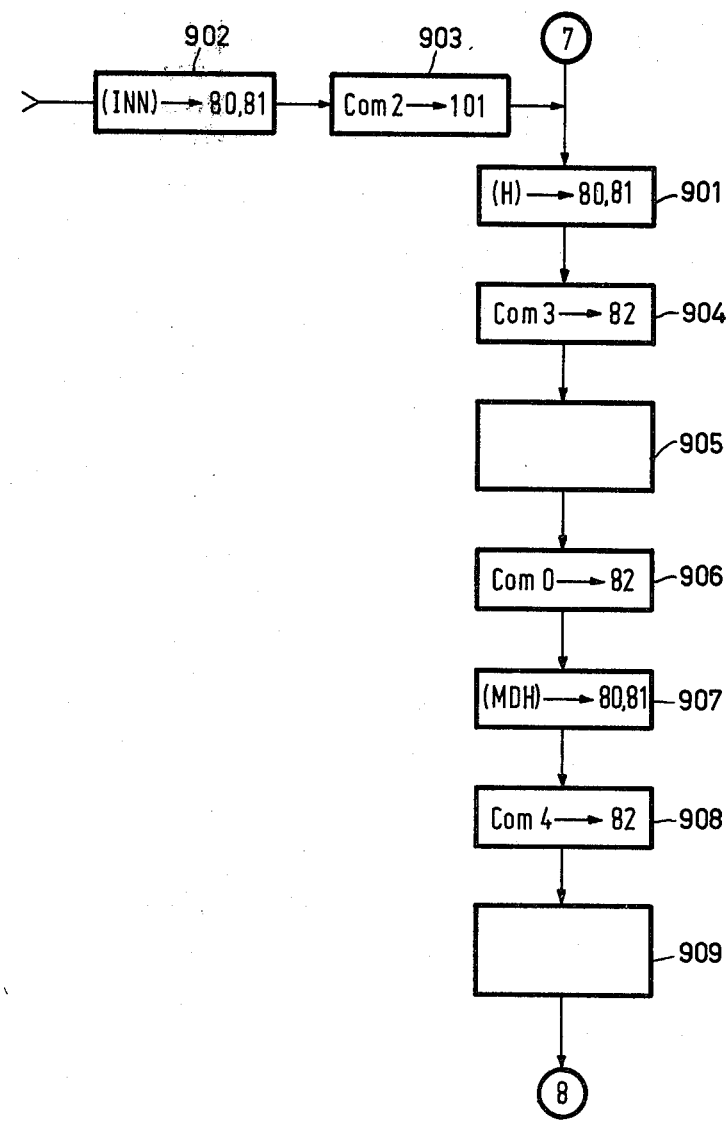

The flow chart of phase 5 is represented in FIG. 11E. In this phase, in step 901, a portion of the altitude word (H) obtained in phase 4 is first written into register 80 and the other portion in register 81, or the altitude word obtained in phase 2 is used in this phase 5. To this end, in step 902, a portion of the content of store INN is written into register 80 and the other portion in register 81. In addition, in step 903, the code word COM 2, which is formed by the two code words in the registers 80 and 81, is written into register 101. The indicator now displays the altitude in digital form.

When the altitude word (H) obtained in phase 4 is stored, by means of step 901, in register 80, 81, a code word COM 3 is written into the register 82 in step 904, causing switch 85 to be closed and capacitor 52 to be charged. As the charging time of this capacitor 52 is rather long, the wait sub-program 905 is now carried out. At the end of this wait-sub-program the code word COM 0 is written into the register 82 in step 906, in response to which switch 85 is opened again. Thereafter, in step 907, the code word (MDH) is written into the register 80, 81. This code word defines unwinding of the belt 2. Thereafter, in step 908, a code word COM 4 is written into the register 82, which causes switch 86 to be closed. As the charging time of capacitor 53 is also rather long, a further wait-sub-program 909 is carried out. At the end of this wait-program 909 phase 6 is started.

Figure 11F:
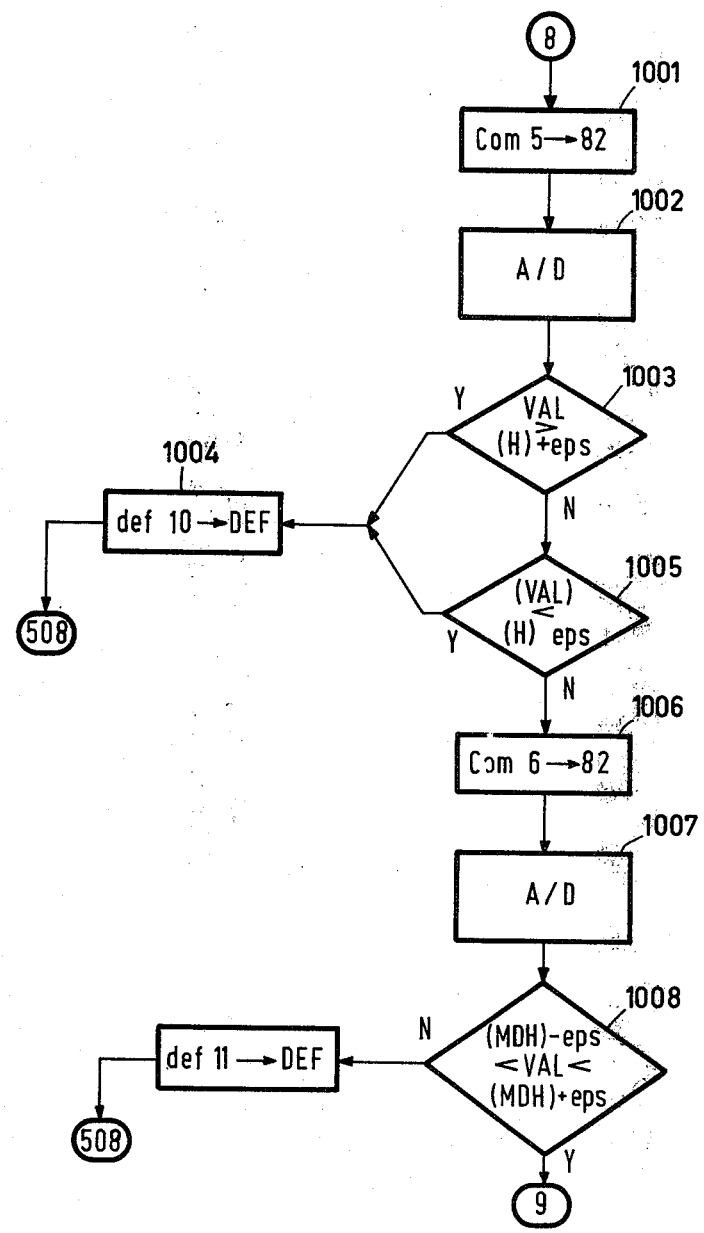

The flow chart of phase 6 is shown in FIG. 11F. In this phase, in step 1001, a code word COM5 is written into the register 82. This causes the switching deivce 121 to be operated, such that the output signal of potentiometer 16 is applied to the differential amplifier 120 and it is now ensured that the difference voltage becomes zero. To this end, in step 1002, this difference voltage is converted into the code word (VAL) and stored in the store VAL. Thereafter, in step 1003, it is checked whether (VAL) is greater than (H), increased with a margin eps. When (VAL) satisfies the criterion, an error code def 10 is generated which, by means of step 1004, triggers the corresponding error program via the store DEF. When (VAL) does not satisfy the criterion of step 1003, then, in step 1005, it is checked whether (VAL) is smaller than (H), decreased by the margin eps. When VAL satisfies this criterion then, again by means of step 1004, the error program is triggered. When (VAL) does not satisfy this criterion of step 1005 the procedure is continued and a code word COM 6 is written into the register 82 in step 1006. The position of the belt 10 is controlled by the above procedure. In response to this code word COM 6, the output of potentiometer 22 is connected to an input of the differential amplifier 120, whose output signal after analog-to-digital conversion in step 1007 in response to which a code word (VAL) is obtained again, is written into the store VAL. In step 1008 it is checked whether (VAL) is now greater than (MDH)−eps and smaller than (MDH)+eps. When (VAL) does not satisfy this criterion the error code def11 is generated which, in accordance with step 1009, again activates the associated error sub-program via the store DEF.

Figure 11G:
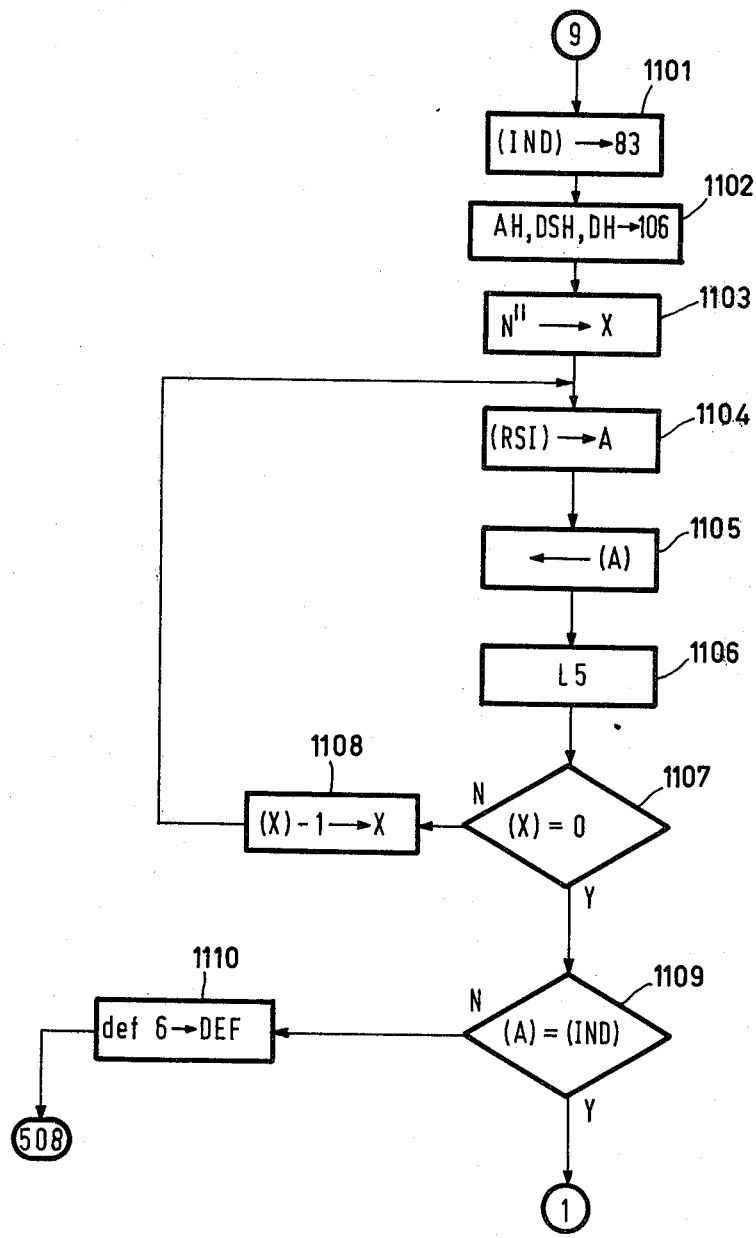
Figure 11:
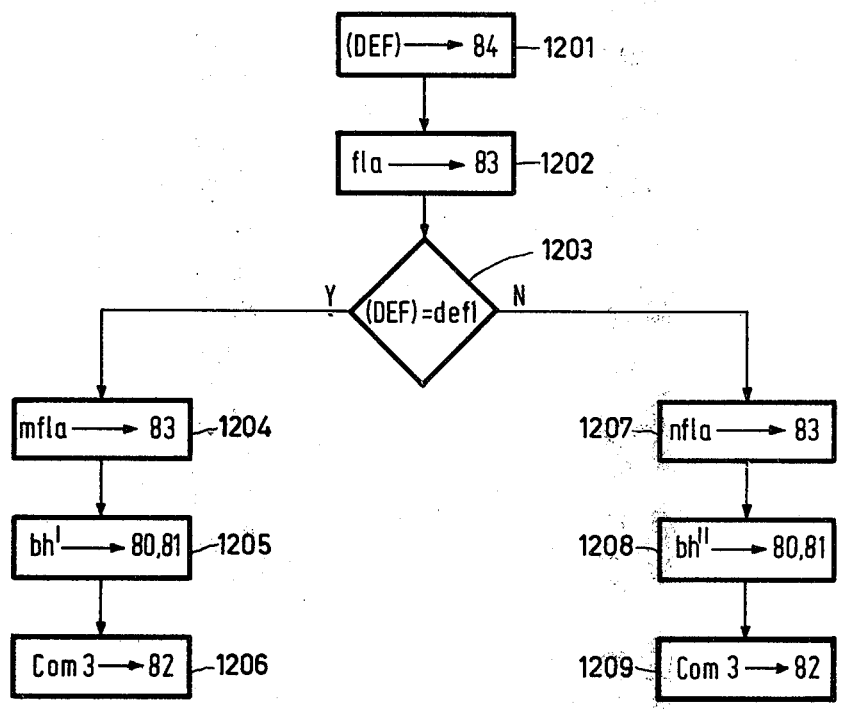

The flow chart of phase 7 is shown in FIG. 11G. In this phase, in step 1101, the code word (IND), which was stored in store IND is transferred to register 83. A logic "1" or a logic "0" voltage is found on the lines AH, DSH, DH which are connected to the register 83. The code word IND is now such that the further lines FLS, PR and PI, which are also connected to this register, all carry the logic value "0". Thereafter, in step 1102 the register 106 is addressed such that the logic values of the lines AH, DSH, DH are written into this register 106. The n" bits stored in this register 106 are thereafter transferred, in step 1103, to the store X. Thereafter, the signal present on line RS1 is transferred in step 1104, to the store A. Thereafter, all bits of the code word (RS1) stored in this store A are shifted to the left in step 1105. In step 1106 line L5 is activated such that also in the register 106 the code word stored therein is shifted one bit location. The number of shift steps is counted in step 1107. When the proper number of shift steps has not yet been attained, then, in step 1108, the desired number is reduced by one and the procedure is started again with step 1104. When the proper number of shift steps has been applied to the register 106, then (X)=0 and in step 1109 the content of the store A is compared with the content of the store IND. When (A) is unequal to (IND), the error code def6 is generated which activates the corresponding error program by means of step 1110 via the store DEF. If, however, (A)=(IND), then step 610 of phase 1 is started.

FIG. 11H shows the flow chart of the error-sub-program such as it has already been described in step 508 of phase 1. To carry out this program the content of the store DEF is transferred to the register 84 in step 1201, which causes the type of the error to be displayed on the display device 97. Thereafter, a code fla is written into the register 83 in step 1202. This causes line FLA to be activated in response to which the flag 95 appears before the window. Thereafter, in step 1203, it is checked whether the error code def 1 has been generated. If def 1 has indeed been generated, this means that the information applied to the input 1 is not correct, which is then blamed on a faulty functioning of the radio altimeter itself. In this case the code fla in register 83 is replaced by the code mfla; this is shown by step 1204. This code mfla keeps the line FLA active, but also activates the line PR, causing the pilot lamp 98 to light up (see FIG. 7). Thereafter, in step 1205, a code bh' is written into the registers 80, 81, this code causing, after having been converted into a analog voltage, such a displacement of belt 2 that the peephole 42 is now opposite the pilot lamp 98. Finally, in step 1206 the code word COM 3 is written into the register 82, causing switch 85 to close.

When the error code which is applied to the store DEF is not defl, this is an indication of a faulty operation of the indicator. In step 1207 a code nfla is now written into the register 83. It appears that this has activated line FLA, and also line PI is activated. In step 1208 a code bh" is written into the registers 80, 81, causing belt 2 to be displaced so that the display window 42 is positioned opposite the pilot lamp 97. Thereafter, in step 1209 the code word COM 3 is written into the register 82 causing the switch 85 to close.

Figure 11K:
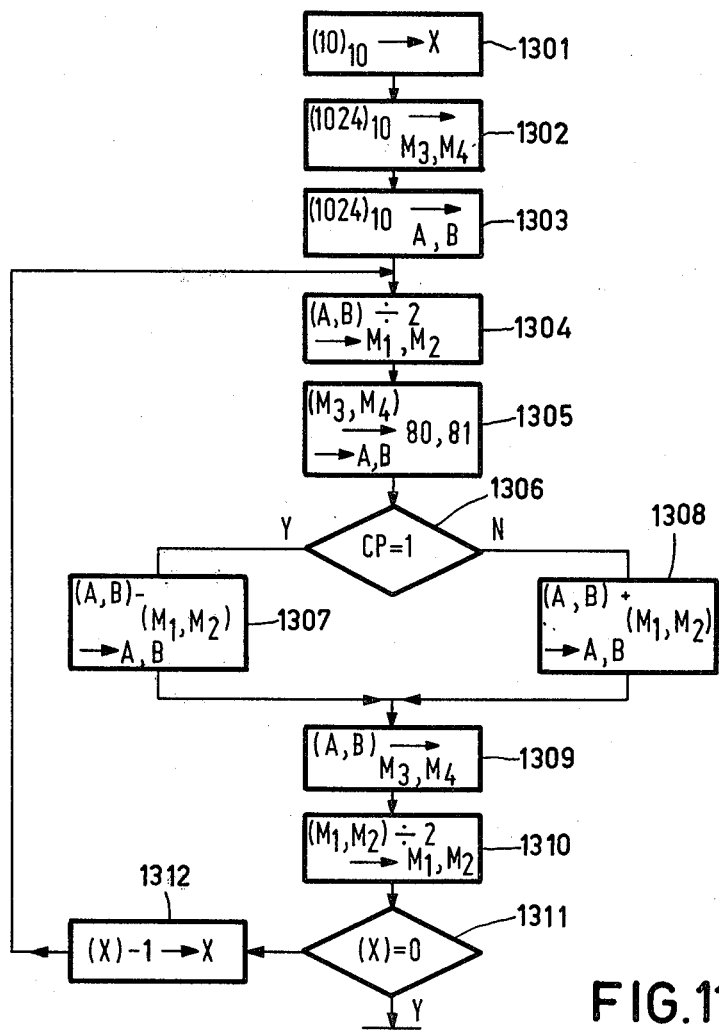

FIG. 11K shows the flow chart of the sub-program (steps 1002 and 1007) which causes an analog signal to be converted into a digital signal. To that end the "successive approximation A/D conversion" method is used. In this sub-program the decimal number 10 is written into the store X, in a step 1301. This number indicates the number of bits into which the analog input signal must be encoded. The number of signal levels (1024) corresponding therewith is on the one hand written into the stores M3 and M4 by means of step 1302 and on the other hand into the sores A and B by means of step 1303. In a step 1304, the contents of the stores A and B are divided by a factor of two and the result thereof is written into the stores M1, M2. Thereafter, in a step 1305 the contents of the stores M3, M4 are written in the registers 80, 81 and also into the stores A, B. Thereafter, in step 1306, the state of line CP is determined. When CP=1, the contents of the registers 80, 81 are too high. In that case, in step 1307, the contents of the stores A, B are reduced by the content of stores M1, M2 and the difference is again written into the stores A, B. When CP=0 the contents of the registers 80, 81 are too low. In this case, the contents of the stores A, B are increased in step 1308 by the contents of the registers M1, M2 and the sum is again written into the stores A, B. Thereafter, step 1309 is carried out in which the contents of the stores A, B are transferred to the stores M3, M4. Thereafter, in step 1310 the contents of the stores M1, M2 are divided by a factor of 2 and the result is again written into these stores M1, M2. Thereafter, in step 1311, the value of X is determined. When X=0, all ten bits have been determined, which means the end of the program. When X=unequal to zero, X is reduced in step 1312 (X) by one and the sub-program is again cycled through, starting from step 1304.

Figure 11M:
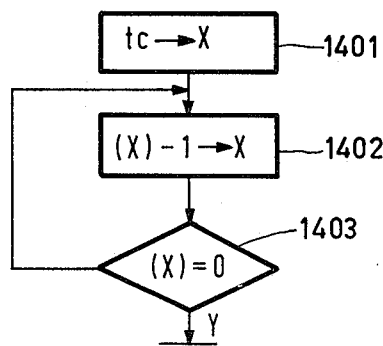

Finally, FIG. 11M shows the flow chart of the wait-sub-program of step 905 and 909. In this sub-program, in step 1401, a code tc which corresponds with the period of time in which the capacitor 52 or 53 is charged is written into the register X. Thereafter, the content (X) of this store X is reduced by one in step 1402. In a step 1403 it is checked whether (X)=0. If so this is the end of the program. If, however, (X) is unequal to zero this sub-program is again cycled through, starting from step 1402.

Figure 13:
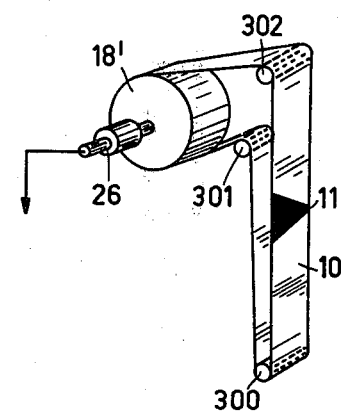
FIG. 13 shows a further possible arrangement of the reference belt.

FIG. 13 shows an alternative manner in which the belt 10 may be mounted. As the mark 11 must coincide with only a small area of the belt 2, the extent to which this belt 2 can be displaced is limited. This belt 3 is then constructed as an endless belt and is wound around a driving drum 18', which forms part of the shaft of the motor 26 and around several guide rollers 300, 301, 302. The diameter of the drum 18' is such that one revolution of this drum corresponds to the total displacement of the belt 10.

Figure 14:
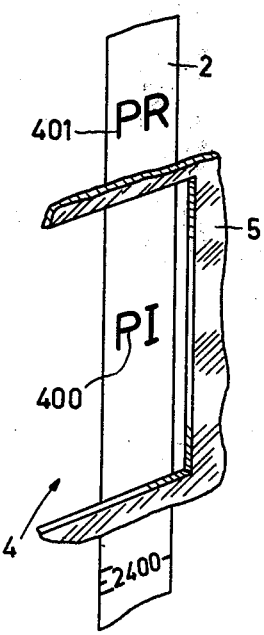
FIGS. 14 and 15 show the position, on the graduated belt, of letters which indicate the origin of defects.
Figure 15:
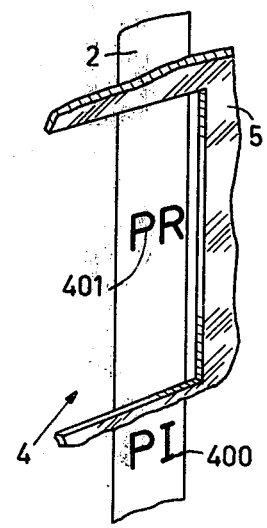

The FIGS. 14 and 15 show an alternative method of displaying the nature of the trouble. In this case, two abbreviations, PR and PI, are marked on the belt, which indicate the nature of the trouble. The abbreviation PI corresponds with a defect in the indicator and the abbreviation PR with a defect of the radio altimeter. These abbreviations are spaced so far apart that when the abbreviation PI must appear, only this abbreviation is displayed in the window 4 (FIG. 14), the graduations and the other abbreviation being hidden, and when the abbreviation PR must appear, only this abbreviation PR is visible in this window 4 (FIG. 15).

What is claimed is:

1. An apparatus for indicating altitudes, comprising:
   (a) means for receiving an electrical signal representative of a first altitude;
   (b) a movable first belt bearing indicia representative of specific altitudes;
   (c) an indicator for indicating an altitude on the first belt;
   (d) means for positioning the first belt relative to the indicator to effect indication of the first altitude;
   (e) means for providing an electrical signal representative of a second altitude;
   (f) a movable second belt bearing a reference mark;
   (g) means for positioning the second belt relative to the first belt to effect indication by the reference mark of the second altitude on the first belt;
   characterized in that said means for positioning the first and second belts comprise, respectively:
   (h) a first control including;
      1. a first converter coupled to the first belt for producing an electrical signal representative of the position of the belt;
      2. a first comparator having respective inputs for receiving a first control signal and the electrical signal representative of the position of the first belt, and having an output at which is provided an output signal representative of a difference between these received signals; and
      3. a first driving means coupled to the first belt and electrically-connected to the output of the first comparator; and
   (i) a second control including:
      1. a second converter coupled to the second belt for producing an electrical signal representative of the position of the belt;
      2. a second comparator having respective inputs for receiving a second control signal and the electrical signal representative of the position of the second belt, and having an output at which is provided an output signal representative of a difference between these received signals; and
      3. a second driving means coupled to the second belt and electrically-connected to the output of the second comparator;
   (j) an arithmetic unit including first and second inputs for receiving the electrical signals representative of the first and second altitudes, respectively, and at least one output, for providing the first and second control signals to the first and second comparators, said arithmetic unit comprising:
      1. means for producing the first control signal, said first control signal representing the first altitude; and
      2. means for producing the second control signal, said second control signal representing the difference between the first and the second altitudes.

2. An indicating apparatus as in claim 1 wherein at least one of the belts is an endless belt and the driving means for said belt comprises a motor-driven drum around which said belt is wound.

3. An indicating apparatus as in claim 2 and further including a window through which the belts can be viewed, said endless belt being the second belt and said drum having a diameter such that one revolution of the drum causes the reference mark on said belt to move from a hidden position outside one end of the window to a hidden position outside the other end of the window.

4. An indicating apparatus as in claim 1, 2 or 3, where the arithmetic unit comprises an analog device.

5. An indicating apparatus as in claim 1, 2, or 3 where the arithmetic unit comprises a digital device.

6. An indicating apparatus as in claim 5, where the arithmetic unit comprises a microprocessor.

7. An indicating apparatus as in claim 6 and further including means for displaying an error code representive of an error occuring during processing by the microprocessor.

8. An indicating apparatus as in claim 5 wherein said digital arithmetic unit alternately produces the first and second control signals, said apparatus further comprising:
 (a) a digital-to-analog converter having an input for receiving said alternately-produced first and second control signals and having an output for providing said first and second control signals in analog form;
 (b) first and second analog storage means electrically-connected to the control signal inputs of the first and second comparators, respectively; and
 (c) switching means for alternately-connecting the output of the digital-to-analog converter to the control signal inputs of the first and second comparators, said switching means electrically-connecting the converter output to the control signal input of the first comparator when the first control signal is produced, and electrically-connecting the converter output to the control signal input of the second comparator when the second control signal is produced.

9. An indicating apparatus as in claim 5 where a predetermined range of altitudes are represented by indicia on the first belt which are nonlinearly-spaced, said arithmetic unit including a linear-to-nonlinear inverter having an input for receiving the first altitude signal and having an output at which are provided codes representative of the altitudes represented by the first altitude signal, the codes for said predetermined range of altitudes corresponding to the positions of the non-linearly spaced indicia on the first belt, said codes effecting production of the first control signal.

10. An indicating apparatus as in claim 9, where the first belt is wound on a drum and where said arithmetic unit further includes a converter for converting the codes produced by the linear-to-nonlinear converter to codes which take into consideration the effect on the displacement of the belt, for a specific angular rotation of the drum, the thickness of the belt wound on the drum, said modified codes effecting production of a first control signal which causes displacement of the first belt in accordance with the expression:

$$I = R_o \left( I + e \cdot \frac{\theta}{2\pi} \right) \cdot \theta$$

where "I" is the belt displacement caused by the code produced by the linear-to-nonlinear converter, $R_o$ is the radius of the drum, "e" is the thickness of the belt wound on the drum, and $\theta$ is the angle the drum must be rotated to cause the displacement "I".

11. An indicating apparatus as in claim 1, 2 or 3 where one belt includes a peephole and where said apparatus further includes a digital element for displaying information through the peephole when said belt is moved to a predetermined position.

12. An indicating apparatus as in claim 11, where the digital element displays altitude information not marked on the belts.

13. An indicating apparatus as in claim 11, where the digital element includes two lamps, one for signaling an error in the electrical signal representative of the first altitude and one for signaling a malfunction of the indicating apparatus.

14. An indicating apparatus as in claim 1, 2 or 3 where the arithmetic unit includes means for limiting the travel of the second belt when the referenced mark is not visible.

15. An indicating apparatus as in claim 1, 2 or 3, where said arithmetic unit comprises:
 (a) a microprocessor;
 (b) a data bus electrically-connected to the microprocessor for transmitting data to and from the microprocessor;
 (c) an address code bus electrically-connected to the microprocessor for transmitting address codes produced by the microprocessor;
 (d) a plurality of registers having respective inputs electrically-connected to the data bus for receiving data produced by the microprocessor; and
 (e) a transcoding device having an input connected to the address code bus and having outputs for producing digital control signals for controlling operation of the registers.

16. An indicating apparatus as in claim 15 where said first and second converters produced analog signals, said apparatus further including:
 (a) a digital-to-analog converter having an output, and a plurality of inputs connected to outputs of one of the registers;
 (b) analog switching means having respective inputs electrically-connected to the first and second converters, a control input for receiving predefined digital control signals, and an output which is selectively connected to one of the inputs in response to the digital control signals;
 (c) comparison means having respective inputs connected to the output of the digital-to-analog converter and the output of the switching means, said comparison means producing, at its output, logic signals representative of the relative magnitudes of the analog signals applied to its inputs; and
 (d) digital switching means having an input connected to the output of the comparison means, a control input for receiving predefined digital control signals and having an output connected to the data bus, said digital switching means connecting the output of the comparison means to the data bus in response to the digital control signals.

17. An indicating apparatus as in claim 16, where the electrical signal representative of the second altitude is an analog signal and where the analog switching means includes an input connected to the means for providing said electrical signal.

18. An indicating apparatus as in claim 16 where the digital control signals for the analog switching means are produced by the microprocessor and applied to the analog switching means via the data bus and an output register.

19. An indicating apparatus as in claim 16 and further including
 (a) first and second analog storage means connected to the control inputs of the first and second comparators, respectively;
 (b) a first switch having an input connected to the digital-to-analog converter output, a control input for receiving a predefined digital control signal and an output connected to the first analog storage means; and
 (c) a second switch having an input connected to the digital-to-analog converter output, a control input for receiving a predefined digital control signal and an output connected to the second analog storage means;

said first and second switches connecting the output of the digital-to-analog converter to the respective storage means in response to their respective digital control signals.

20. An indicating apparatus as in claim 1, including a window through which the belts can be viewed, one of said belts bearing first and second marks spaced sufficiently far apart so that only one mark at a time can be viewed, the first mark being made visible to indicate an error in the signal representative of the first altitude and the second mark being made visible to indicate a malfunction of the indicating apparatus.

* * * * *